United States Patent
Jürgensen

(10) Patent No.: US 6,999,481 B1
(45) Date of Patent: Feb. 14, 2006

(54) METHOD AND DEVICE FOR REDUCING THE PUMP LIGHT IN A SHEAT-PUMPED FIBER LASER OUTPUT

(75) Inventor: Heinrich Jürgensen, Raisdorf (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 09/445,112

(22) PCT Filed: May 27, 1998

(86) PCT No.: PCT/DE98/01449

§ 371 (c)(1),
(2), (4) Date: Feb. 17, 2000

(87) PCT Pub. No.: WO98/56083

PCT Pub. Date: Dec. 10, 1998

(30) Foreign Application Priority Data

Jun. 3, 1997 (DE) ................................. 197 23 267

(51) Int. Cl.
*H01S 3/30* (2006.01)
(52) U.S. Cl. ............................... 372/6; 372/71; 372/75; 372/66; 372/28; 372/20; 385/89; 385/115; 385/120; 385/27; 385/15; 385/19; 385/25; 350/96.33
(58) Field of Classification Search .................. 372/6, 372/71, 75, 66, 28, 20; 385/89, 115, 120, 385/127, 15, 19, 28, 27, 25; 350/96, 33
See application file for complete search history.

(56) References Cited

U.S. PATENT DOCUMENTS

| 4,680,767 | A | * | 7/1987 | Hakimi et al. ................. 372/6 |
| 4,761,047 | A | * | 8/1988 | Mori ........................... 607/88 |
| 4,829,529 | A |   | 5/1989 | Kafka |
| 5,048,026 | A | * | 9/1991 | Shaw et al. .................... 372/6 |
| 5,212,746 | A | * | 5/1993 | Miller et al. .................. 385/25 |
| 5,290,280 | A | * | 3/1994 | Daikuzono .................... 606/16 |
| 5,343,543 | A | * | 8/1994 | Novak, Jr. et al. ............ 385/31 |
| 5,509,093 | A | * | 4/1996 | Miller et al. .................. 385/27 |
| 5,537,499 | A | * | 7/1996 | Brekke ........................ 385/31 |
| 5,566,196 | A | * | 10/1996 | Scifres ......................... 372/6 |
| 5,966,490 | A | * | 10/1999 | Minns et al. ............... 385/127 |
| 6,222,970 | B1 | * | 4/2001 | Wach et al. ................ 385/115 |
| 6,263,002 | B1 | * | 7/2001 | Hsu et al. ...................... 372/6 |
| 6,272,155 | B1 | * | 8/2001 | Sekiguchi ...................... 372/6 |

(Continued)

FOREIGN PATENT DOCUMENTS

EP          0 497 140          5/1992

OTHER PUBLICATIONS

8106 IEEE Journal of Quantum Electronics 31 Feb. 1995, No. 2, New York, U.S.—Cladding-Pumped Fiber Laser—Weber et al.

*Primary Examiner*—Minsun Oh Harvey
*Assistant Examiner*—Delma R. Flores-Ruiz
(74) *Attorney, Agent, or Firm*—Schiff Hardin LLP

(57) ABSTRACT

A pump fiber is stripped of its cladding over the last section. This can occur by etching a coating off. The sheath is preferably etched off wedge-shaped. As a result thereof, the remaining pump power is eliminated into the environment. How much stray pump light still proceeds via the fiber core to the fiber exit can be monitored over a length of the fiber completely stripped of the protective sheath.

11 Claims, 1 Drawing Sheet

U.S. PATENT DOCUMENTS 6,477,295 B1 * 11/2002 Lang et al. .................. 385/31
6,489,985 B1 * 12/2002 Brodsky et al. ............ 347/247
6,731,837 B2 * 5/2004 Goldberg et al. ............ 385/27
6,738,396 B2 * 5/2004 Filgas et al. ................. 372/19
6,751,241 B2 * 6/2004 Davis et al. ................... 372/6

* cited by examiner

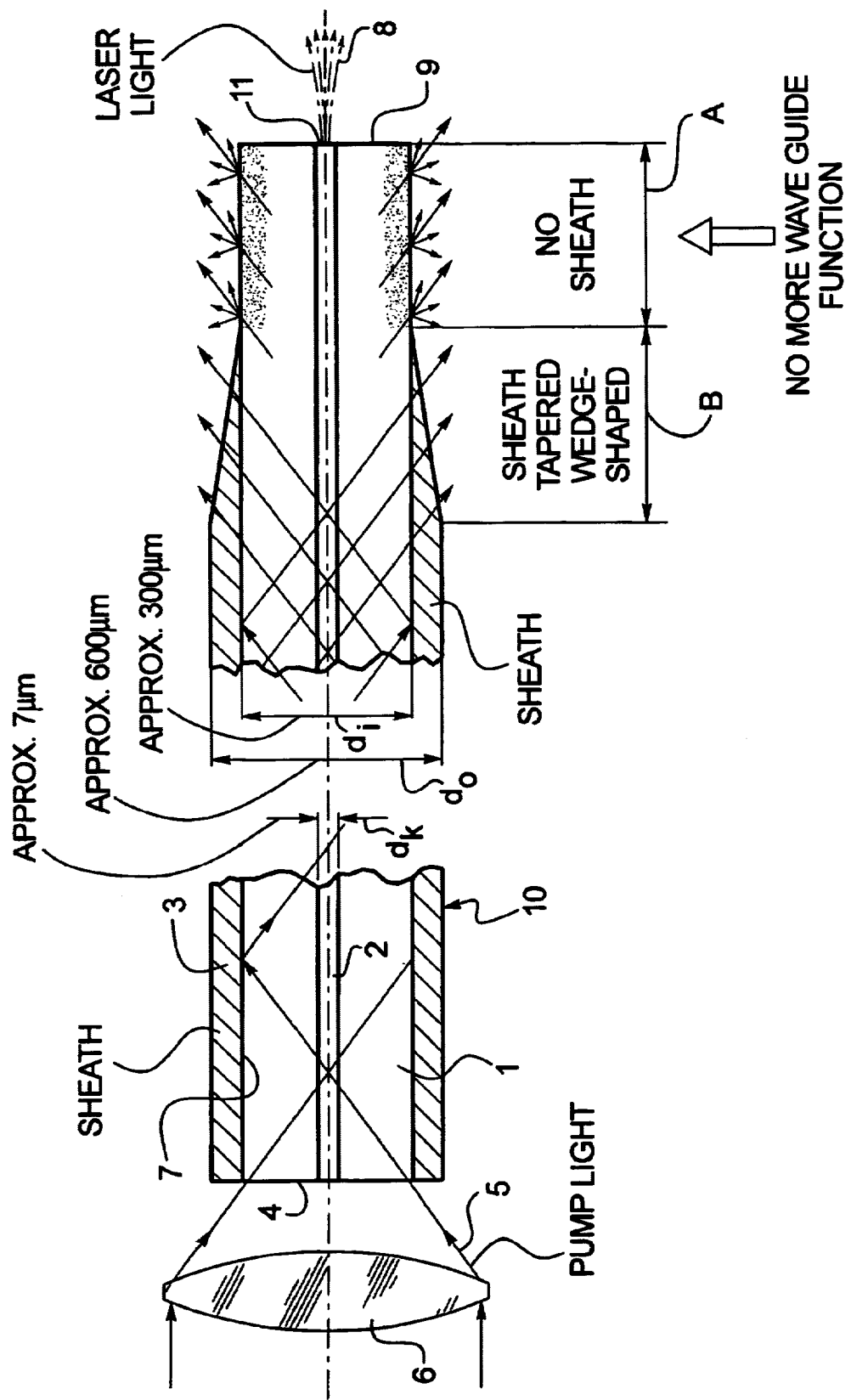

METHOD AND DEVICE FOR REDUCING THE PUMP LIGHT IN A SHEAT-PUMPED FIBER LASER OUTPUT

BACKGROUND OF THE INVENTION

In a fiber laser, the resonator is composed of a specific fiber that contains a single mode fiber in the inside core this being matched in terms of dimensions and material to the wave length range of the laser to be achieved and the diameter thereof lying in the region of a few µm. This "laser fiber" is surrounded by a "pump fiber" having a diameter of a few hundred µm into which the pump light is coupled. The "laser fiber" is thus embedded into the core of the pump fiber. The pump fiber is surrounded by a sheath of material having a different refractive index that guarantees the guidance of the pump light in the pump fiber, as known from light waveguide technology. The core of the pump fiber can have a round cross-section but can also have a cross-section deviating therefrom, for example rectangular or quadratic, in order to enable an especially good matching to the pump source (laser diode).

The pump mechanism occurs in that the pump light excites the laser fiber. As a result thereof, the pump energy is consumed more and more over the length of the fiber, namely, beginning at the pump source, the energy content of the pump fiber drops roughly exponentially up to the end, i.e. to the laser exit. Optical efficiencies of above 50% are achieved with fiber lasers. For that purpose, fiber lengths of approximately 50 meters are required. Up to 90% of the pump light has been consumed by the end of the fiber. Due to the exponential consumption of the pump power, it is not meaningful for economical reasons to make the pump fiber even longer, i.e. approximately 10% of the pump light emerges from the pump fiber and is superimposed on the laser light from the inner core of the fiber; the laser light thereby emerges from the fiber as a thin, diffraction-limited bundle, whereas the pump light has a very large aperture angle.

The wave length of the pump source of a known fiber laser lies at 900 nm; the wave length of the corresponding laser lies at 1100 nm. The pump power of this laser amounts to 20 W; the laser power amounts to approximately 10 W. Approximately 2 W pump power are superimposed on the laser light.

Given applications that attach importance to a precise laser power on the order of magnitude of 1%, as is generally required, for example, in reprographics, the presence of the pump light leads to considerable problems, since it does not follow the beam path of the laser light because of the different aperture. Substantial measuring errors in the sensors thus occur due to stray light that the pump light causes. Likewise, inadmissible heating by the pump light occurs in sensitive arrangements.

Although the pump light could be separated from the laser light by a steep edge filter, the filters are easily destroyed given high power densities. This leads to a spatially large structure and expensive filters. It would likewise be conceivable to intercept the pump light with suitable diaphragms. The problem with this is that either the diaphragms must be made so large that they also allow pump light to pass or there is the risk that the diaphragms burn given slight mis-adjustment.

SUMMARY OF THE INVENTION

Exemplary of a laser diode pumped fiber laser with a pump cavity in the prior art is U.S. Pat. No. 4,829,529. In that patent, the fiber laser is provided having a single mode fiber core of laser material pumped by a high power coherent laser diode source wherein a multi-mode fiber is provided around the single mode core to define a pump cavity. The cladding or sheet 16 extends all the way to the end of the fiber.

An object of the invention is to find a simple method and a simple arrangement with which the remaining pump light is not even allowed to come to the end of the fiber but is already completely intercepted earlier, so that a reduction of the emerging pump light by at least the factor of 100 is achieved.

According to the invention, a method is provided for reducing pump light in an exit of a fiber laser formed of a fiber core surrounded by an inner fiber portion which in turn is surrounded by a sheath. A last section of the fiber laser preceding a light exit for laser light thereof does not have provided thereat at least a portion of the sheath.

BRIEF DESCRIPTION OF THE DRAWINGS

FIG. 1 shows the fiber laser of the invention in which pump light has been reduced in an exit thereof.

DESCRIPTION OF THE PREFERRED EMBODIMENTS

FIG. 1 shows a pump fiber thaws shown in two cut sections for drafting-oriented reasons. The pump light 5 is supplied via a focusing optics 6 at one end 4 of the fiber 10, the left end in the drawing. Let the pump fiber have a fiber core 2 surrounded by an inner fiber portion 1 and a diameter $d_k$ of approximately 7 µm, an inside diameter $d_i$ of approximately 300 µm and an outside diameter $d_o$ of approximately 600 µm. The pump light is guided by total reflection at the inside wall of the waveguide, this being illustrated with light rays 8 provided with arrow at end face 9. According to the invention, the pump fiber 10 is stripped of its sheath 3 over the last section A, i.e. in the right-hand part of the drawing (for example, over the last 50 cm). This can occur by etching off the coating. The sheath is preferably etched off wedge-shaped, so that it tapers at section B over, for example 40 cm beginning at the end facing toward the pump source and is then completely removed for a further 10 cm. As a result thereof, the remaining pump power of approximate 2 W is continuously eliminated into the environment over the distance of 40 cm. The pump fiber 10 is usually surrounded by a protective sheath 7 of tensile material, for example Kevlar fibers, that is in turn surrounded by a metal sheath. The heat transfer into the protective sheath can thus be controlled over the length of the wedge-shaped distance, so that no overheating occurs. How much stray pump light still proceeds via the fiber core 2 to the fiber exit 11 at end face 9 can be checked over the length of the fiber completely freed from the protective sheath. A length of 10 cm is completely adequate for most applications. In order to avoid reflections at the fiber end or exit, the fiber end can also be additionally roughened. This can occur by grinding or by additional etching.

Although various minor changes and modifications might be proposed by those skilled in the art, it will be understood that my wish is to include within the claims of the patent warranted hereon all such changes and modifications as reasonably come within my contribution to the art.

I claim:

1. A method for reducing pump light in a region of a laser light exit of a laser resonator fiber, comprising the steps of:

providing said laser resonator fiber as comprising a fiber core surrounded by a pump fiber comprising an inner fiber portion which in turn is surrounded by a sheath;

at a light entrance end of said pump fiber, inputting pump light so that laser light arises in said fiber core and exits from said fiber core at said laser light exit; and at a last section of said pump fiber preceding said laser light exit, allowing substantial remaining pump light to escape from the pump fiber to reduce pump light from being emitted with the laser light at said laser light exit by removing at least a portion of the sheath at said last section.

2. The method according to claim 1 including the step of at least partially stripping said last section of said sheath.

3. The method according to claim 2 wherein the sheath is entirely stripped away at said last section.

4. The method according to claim 1 wherein during manufacture of said last section only at least a part of said sheath is provided thereon.

5. The method according to claim 4 wherein during manufacture of said last section no sheath is provided thereon at all.

6. The method according to claim 1 including the step of providing said sheath such that a diameter thereof tapers in wedge-like fashion toward said light exit in a region of said last section.

7. The method according to claim 1 including the step of removing at least the portion of said sheath at said section by etching.

8. A fiber laser, comprising:

a pump light;

a laser fiber core as a laser resonator surrounded by a pump fiber comprising an inner fiber portion which in turn is surrounded by an outer sheath, said pump light being received in said pump fiber at a light entrance end thereof, and said fiber core having a laser light exit at an end thereof opposite said light entrance end of said pump fiber where a laser light arising in said fiber core exits; and at a last section of the pump fiber leading to said light exit, substantial remaining pump light escapes from the pump fiber so that pump light emitted with laser light at said laser light exit is reduced, since at said last section said sheath is at least partially removed.

9. The system according to claim 8 wherein the sheath at said last section is entirely removed.

10. The system according to claim 8 wherein at a region of said last section said sheath tapers in a wedge-like fashion toward said light exit.

11. The system according to claim 8 wherein at said last section said sheath is removed completely and an outer portion of said inner fiber portion is roughened where said sheath is completely removed leading to said laser light exit.

* * * * *